Figure 5:
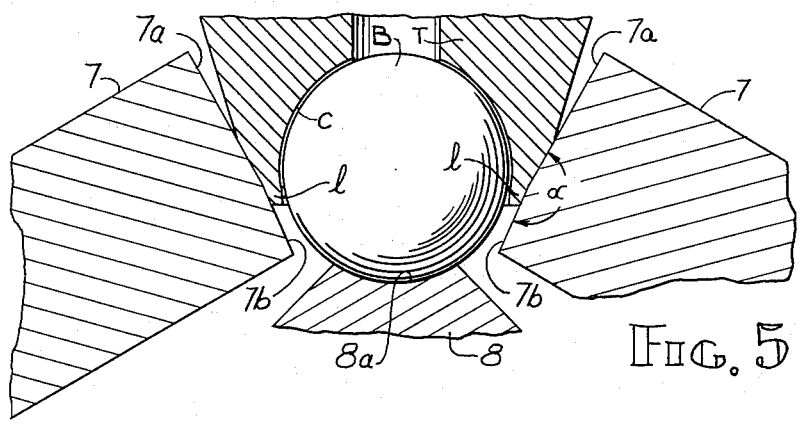

July 18, 1961 L. S. LOCKART 2,992,572
BALL POINT SPINNING TOOL
Filed June 2, 1958 2 Sheets-Sheet 1
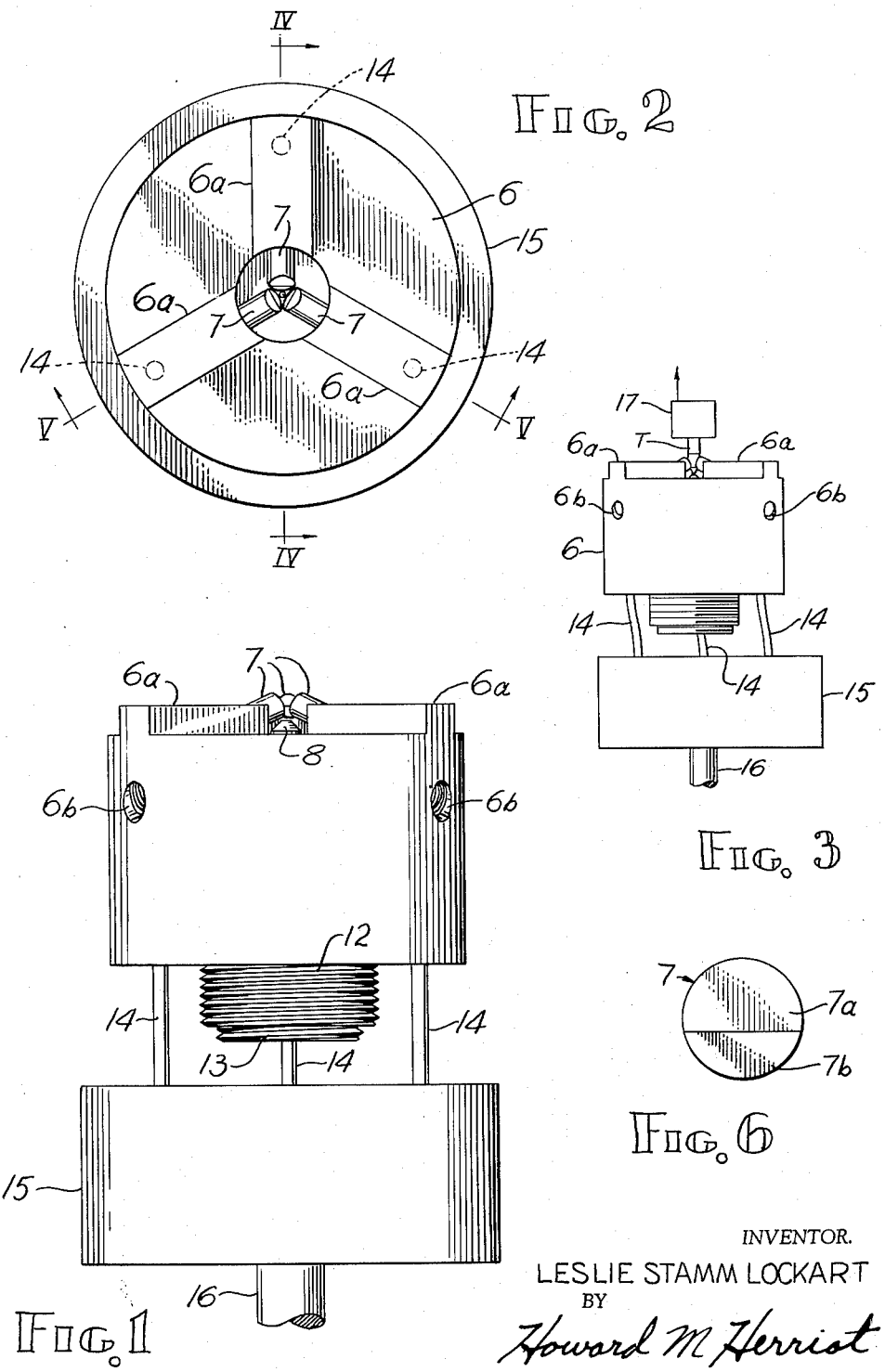
INVENTOR.
LESLIE STAMM LOCKART
BY
Howard M. Herriot
ATTY.

July 18, 1961 L. S. LOCKART 2,992,572
BALL POINT SPINNING TOOL
Filed June 2, 1958 2 Sheets-Sheet 2

INVENTOR.
LESLIE STAMM LOCKART
BY
Howard M. Herriot
ATTY.

United States Patent Office 2,992,572
Patented July 18, 1961

2,992,572
BALL POINT SPINNING TOOL
Leslie Stamm Lockart, Janesville, Wis., assignor to The Parker Pen Company, Janesville, Wis., a corporation of Wisconsin
Filed June 2, 1958, Ser. No. 739,070
3 Claims. (Cl. 78—1)

This invention relates in general to means for assembling ball pen writing points and particularly relates to means for forming a ball-holding lip on the nose of the ball housing or seat to retain the ball freely rotatable in a cavity therein with proper clearance therebetween and with an improved contour of the inner lip surface for better writing performance.

Ball-pointed writing instruments write by reason of a freely rotatable ball held in a tip or seat, herein called a housing. The lip of the nose of the housing or seat extends beyond a transverse plane passing through the center of the ball. Ink or other writing fluid of suitable viscosity is contained within the reservoir in communication with the rear surface of the ball within the cavity. As the ball rotates during writing, a film of ink clinging to the ball passes through the clearance between the ball and the seat and is brought to the paper and transferred to or laid upon the paper. A clearance of proper dimension between the housing and the ball permits the ink to exist therein by capillarity and to be withdrawn therefrom by rotation of the ball, but prohibits ready flow of ink therefrom while the ball is not rotating.

Ball point writing instruments are many times not satisfactory in preventing ink from accumulating or "gooping" on the exterior of the lip of the nose, because ink is scraped from the ball by the front edge or rim of the lip as the ball rotates back into the cavity. This scraping of excess ink from the ball causes a glob or smear to appear on the lip. This causes dirty or messy writing when the lip touches the paper as it occasionally does during writing.

It has been discovered in connection with this invention that such ink accumulation or "gooping" may be prevented by providing means for forming the lip about the ball so that the inner surface of the lip at the forward extremity thereof slopes away from the ball defining a funnel-like opening which allows the unused ink, left clinging to the ball after rolling on the paper, to be funneled back up into the cavity of the ball housing and therefore not left as a "goop" accumulation or globule on the rim of the lip.

This invention also provides means for assembling a textured-surface ball into a ductile ball housing with proper and desirable clearances between ball and seat without damaging the ball. For example, in previous assembly devices, which depend upon either rotating the ball relative to the seat or rolling a tool directly on the ball, when a textured-surface ball is used therewith, the tool bearing or loading on the textured ball tends to wear, and this is aggravated where the tool rides or rolls directly on the textured-surface of the ball. Further, a textured ball will not turn or rotate in the housing or seat during such assembly because the ductile seat material forces itself into the pits of the ball's textured surface thereby preventing rotation of the ball while the bearing or loading pressure exists. This lack of rotation prevents the attainment of desirable clearances between the ball and seat. The prior art devices further do not attain the desirable antigoop "funneling" of the rim of the lip away from the ball. Further, the point pressure of the tool on the textured ball causes a crushing of the ball at the point of contact and the resulting crushed surface acts as an overly large pit or void on the ball surface which later causes a feeling of roughness while writing and also causes excessively high seat wear during the life of the ball point cartridge.

It has been discovered in connection with this invention that the above disadvantages are overcome by providing, in the assembly device, support means supporting the ball in the seat cavity of the housing fixed against rotation relative to the support means and the housing, together with means contacting the outer side of the nose and rotating thereabout to form the lip of the nose with a flaring or funneled rim, and further together with flexible means to transversely shift the housing relative to the rest of the members to bring about perfect axial alignment.

It is therefore an object of this invention to provide a novel lip spinning device for maintaining axial alignment of the ball, the ball housing, and the spinning tool, during the operation of spinning the housing about the ball.

Another object is to provide such a lip spinning device with means for flaring or funneling the rim of the lip of the housing.

It is a further object to provide such a lip spinning device wherein there is no direct bearing of the tool against the ball.

Figure 4:
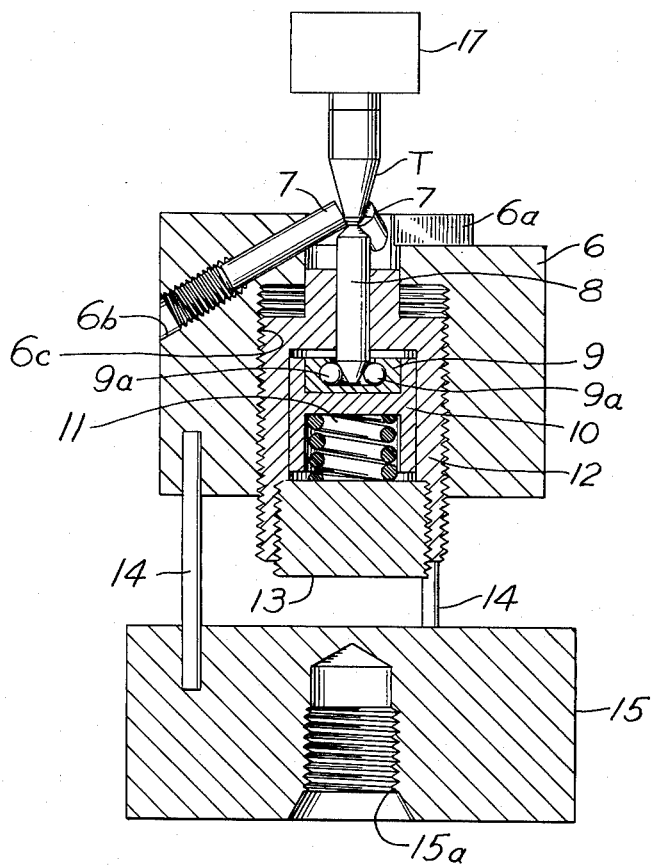

These and other objects and advantages will become apparent from a reading of the following description in connection with the appended drawings, in which:

FIG. 1 is an elevational view of a device embodying the invention;
FIG. 2 is a top plan view thereof;
FIG. 3 is a view similar to that of FIG. 1, but showing the upper portion of the device shifted transversely to align axially with the work, i.e. with the ball and ball housing;
FIG. 4 is a view, partly in section, of the device, the view being taken from lines IV—IV in FIG. 2;
FIG. 5 is a sectional view, from lines V—V in FIG. 2, of a portion of the device and further showing the ball housing in section and the ball in elevation, and illustrating the work and the device during the last stage of the spinning operation; and
FIG. 6 is a plan view of the end face of a tool element of the device.

The invention provides means for assembling a ball B and a ball housing or tip T (also referred to herein as the seat) having a cavity C therein, and forming a lip 1 for retaining the ball freely rotatable in the housing.

The housing T is held in any convenient work holder 17 which is movable relative to the spinning device to move the work into or out of engagement therewith, such motion being indicated by the arrow in FIG. 3.

The spinning device comprises a tool head 6 having three tool-receiving threaded bores 6b therein, and having a center threaded bore 6c therein. Three burnishing tools 7 are fixed to tool head 6 by being threaded into bores 6b. The bores 6b and thus the tools 7 are equidistantly spaced circumferentially about the tool head 6 and about the work. The top of the tool head 6 is formed with three ribs 6a, through which the bores 6b pass, and between which exist spaces allowing for easy exit of any chips or shavings. A center support 8 for the ball B has in its upper end a concavity 8a in which the ball rests. The ball support 8 rides in a bore in the plug 12 of tool head 6 and rests on ball bearings 9a disposed in a ball race 9 resting in a bearing support member 10. The bearing support member 10 is resiliently supported in the tool head 6 by spring 11 which is disposed between the bearing support member 10 and a plug 13; the plug 13 being threaded into the plug 12 which is threaded into bore 6c of tool head 6. This arrangement provides means for permitting axial motion of support 8 relative to tool head 6 and tools 7 but prohibiting relative transverse motion therebetween.

Three flexible connecting pins 14 connect the tool head 6 with a base member 15 which is adapted to be rotatably driven by a shaft 16 connected thereto, as for example by being threaded into threaded bore 15a. The pins 14 are spaced equidistantly circumferentially about tool head 6 and base 15 defining an equilateral triangle when viewed as in FIG. 2. This arrangement permits the tool head 6 to shift transversely of the tool base 15 to thereby perfectly axially align the work with the tool. The tool head 6 of course rotates in unison with the tool base member 15. The transverse shifting movement may be in any direction in a plane perpendicular to the axis of the device.

The assembly of the ball B and the seat or housing T is shown in FIG. 5 during the later stage of the spinning-in or assembly operation.

The operation is described hereinbelow.

The holder 17, holding the housing T with a ball B temporarily held therein, is moved down into engagement with the rotating device (the device could instead be moved up and the holder 17 held stationary). During this relative axial movement of the spinning device and the work, if the work is not in perfect axial alignment with the spinning device, the device moves transversely and thereby axially aligns the work and the device. Ball support 8, which before engagement with the ball, has its concave end projecting beyond its ultimate position during the spinning operation, contacts the ball, and, because of the concavity 8a, causes the ball and consequently the seat to move into alignment with the tool head 6, this being made possible by the flexible aligning pins 14 connecting the driving base 15 and the driven tool head 6.

As soon as the ball starts seating itself in the concave end of the support 8, a slight pressure begins to build up between ball B and support 8 because of spring 5 resiliently biasing the support 8 upwardly. This in turn causes friction to develop between stationary ball B and ball support 8, and causes the support 8 to stop spinning with the tool head 6 and to become stationary with the ball. The ball, the ball support 8, and the housing T all remain stationary, and the tool head 6 and tools 7 spin thereabout.

As the ball B and housing T continue to move downwardly, i.e. to advance axially into the tool, the three polished tools 7 contact the outer surface of the nose of housing T. The pressure developed between the tools 7 and the housing T becomes quite large and the material of the housing T is cold extruded forwardly (downwardly), thinning the nose to form the lip 1, and thus reducing the protrusion of the ball from the housing T, and providing a consistent clearance between the ball and the housing over the greater area of the setting between same.

The face of each tool 7 comprises a first plane surface 7a and a second plane surface 7b having an angle therebetween, measured through the tool, of less than one hundred and eighty but more than one hundred and seventy degrees and preferably of the order of one hundred and seventy-six degrees. This angle is identified as α (alpha) in FIG. 5. The plane of the first surface 7a intersects the axis of the ball housing forwardly of (below) the ball, and the plane of the second surface 7b intersects that axis forwardly of (below) the said intersection of that axis and said first plane.

During the movement of the work advancing into the device, the extruded material passes this "change of angle" on the face of the tool, and the pressure is thereby relieved and the material follows the tool, moving outwardly along surface 7b thereby flaring out to form a funnel-like entrance between the lip and the ball at the rim edge of the lip. The clearance between the housing and the ball rearwardly of the funnel entrance, however, remains small, i.e. a very snug fit and prevents excess ink flow.

I claim:

1. In a machine for assembling a ball and a ball housing to form a ball point writing unit wherein the ball is rotatably held in a cavity formed in the tapered nose of the ball housing, the combination of a tool head, a center post mounted in said tool head and having a concave end on which said ball is adapted to be supported, a holder for supporting a ball housing in substantial alignment with said center post opposite said concave end thereof, spring means for resiliently biasing said post and said holder toward one another to urge said ball into the cavity in the tapered nose of a ball housing supported in said holder, at least one lip forming element mounted in said tool head adjacent to said concave end of said center post for pressure contacting the end portion of the nose of said ball housing, a rotatable drive means, and a flexible coupling interconnected between said drive means and said tool head for rotating said tool head relative to said housing to cause the end portion of said nose to flow around the equator of said ball thereby to rotatably secure said ball in the nose of said ball housing, said flexible coupling providing the sole support for said tool holder, whereby said center post and said lip forming element are movable transverse to the axis of rotation thereof to provide automatic alignment of said lip forming element and said ball with the ball housing.

2. The combination of claim 1 wherein said tool holder is rotatable about a vertical axis, and said ball housing holder is disposed above said tool holder, whereby said ball is adapted to be held by the force of gravity on the concave end of said center post.

3. The combination set forth in claim 2 wherein said flexible coupling comprises a plurality of resilient rods symmetrically located about the axis of rotation of said rotatable drive means.

References Cited in the file of this patent

UNITED STATES PATENTS

| | | |
|---|---|---|
| 1,317,247 | Watts | Sept. 30, 1919 |
| 1,474,066 | Brown | Nov. 13, 1923 |
| 1,640,670 | Schaeffer | Aug. 30, 1927 |
| 2,173,759 | McCloskey | Sept. 19, 1939 |
| 2,325,522 | Lauer et al. | July 27, 1943 |
| 2,343,244 | Rose | Mar. 7, 1944 |
| 2,498,009 | Schrader et al. | Feb. 21, 1950 |
| 2,524,420 | Blampin | Oct. 3, 1950 |
| 2,696,719 | Sklar | Dec. 14, 1954 |
| 2,791,137 | Jones | May 7, 1957 |